(12) United States Patent  
Nozoe

(10) Patent No.: US 11,566,967 B2  
(45) Date of Patent: Jan. 31, 2023

(54) ABNORMALITY DETECTION DEVICE AND ABNORMALITY DETECTION METHOD

(71) Applicant: NIPPON PAPER INDUSTRIES CO., LTD., Tokyo (JP)

(72) Inventor: Susumu Nozoe, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 143 days.

(21) Appl. No.: 17/260,986

(22) PCT Filed: Oct. 30, 2019

(86) PCT No.: PCT/JP2019/042581  
§ 371 (c)(1),  
(2) Date: Jan. 15, 2021

(87) PCT Pub. No.: WO2020/100594  
PCT Pub. Date: May 22, 2020

(65) Prior Publication Data  
US 2021/0293661 A1    Sep. 23, 2021

(30) Foreign Application Priority Data

Nov. 12, 2018 (JP) .............................. JP2018-211970

(51) Int. Cl.  
*G01M 13/045* (2019.01)  
*G01K 1/02* (2021.01)  
*G01P 15/00* (2006.01)

(52) U.S. Cl.  
CPC ........... *G01M 13/045* (2013.01); *G01K 1/026* (2013.01); *G01P 15/00* (2013.01)

(58) Field of Classification Search  
CPC ........ G01K 1/026; G01K 13/08; G01P 15/00; G01M 15/12; G01M 99/002; G05B 23/02  
See application file for complete search history.

(56) References Cited

U.S. PATENT DOCUMENTS

| 5,623,109 A | 4/1997 | Uchida et al. |
| 6,529,135 B1 * | 3/2003 | Bowers ............... H02P 23/0077 340/648 |

(Continued)

FOREIGN PATENT DOCUMENTS

| AU | 2011252966 B2 | 10/2014 |
| CA | 2799402 A1 | 11/2011 |

(Continued)

OTHER PUBLICATIONS

International Search Report and Written Opinion dated Dec. 10, 2019, in connection with International Patent Application No. PCT/JP2019/042581, filed Oct. 30, 2019, 5 pgs. (including translation).

(Continued)

*Primary Examiner* — Natalie Huls  
*Assistant Examiner* — Cynthia L Davis  
(74) *Attorney, Agent, or Firm* — Chiesa Shahinian & Giantomasi PC

(57) ABSTRACT

Provided is an abnormality detection device which detects an abnormality in a target machine, comprising: a first acquisition unit which acquires a drive side temperature of the target machine; a second acquisition unit which acquires a non-drive side temperature of the target machine; a correlation storage unit which stores a correlation between the drive side temperature and the non-drive side temperature based on the drive side temperature and the non-drive side temperature during normal operation of the target machine; a detection unit which detects a deviation from the correlation stored in the correlation storage unit on the basis of the drive side temperature acquired by the first acquisition unit and the non-drive side temperature acquired by the second acquisition unit; and, an output unit which outputs the deviation from the correlation which was detected by the (Continued)

detection unit as an abnormality in the target machine or as an abnormality indication.

17 Claims, 14 Drawing Sheets

(56) References Cited

U.S. PATENT DOCUMENTS

| | | | | |
|---|---|---|---|---|
| 2006/0164040 | A1* | 7/2006 | Ohkubo | G06F 1/30 320/135 |
| 2011/0282626 | A1 | 11/2011 | Rikkola et al. | |
| 2016/0189050 | A1* | 6/2016 | Jaramillo-Velasquez | G06N 5/048 706/52 |
| 2017/0193761 | A1* | 7/2017 | Suzuki | H04B 1/03 |

FOREIGN PATENT DOCUMENTS

| | | | | |
|---|---|---|---|---|
| CN | 103098044 | A | | 5/2013 |
| CN | 106828106 | A * | | 6/2017 ............ B60L 3/0061 |
| JP | H06-4789 | A | | 1/1994 |
| JP | H06-137164 | A | | 5/1994 |
| JP | H06-331507 | A | | 12/1994 |
| JP | H7-159289 | A | | 6/1995 |
| JP | 2006-039786 | A | | 2/2006 |
| JP | 2010-016576 | A | | 1/2010 |
| JP | 2013-008092 | A | | 1/2013 |
| JP | 2016-018526 | A | | 2/2016 |
| JP | 2016-019200 | A | | 2/2016 |
| WO | 2011143458 | A1 | | 11/2011 |

OTHER PUBLICATIONS

International Preliminary Report on Patentability dated May 11, 2021, in connection with International Patent Application No. PCT/JP2019/042581, 13 pgs. (including translation).

Examination Report No. 1 dated Sep. 17, 2021, in connection with Australian Patent Application No. 2019378368, filed Oct. 30, 2019, 3 pgs.

Notice of Reasons for Refusal dated Oct. 23, 2019, in connection with Japanese Patent Application No. 2018-211970, 8 pgs (including translation).

Notice of Reasons for Refusal dated Jan. 14, 2020, in connection with Japanese Patent Application No. 2018-211970, 6 pgs (including translation).

Notice of Reasons for Refusal dated Aug. 25, 2020, in connection with Japanese Patent Application No. 2016-252489, 8 pgs (including translation).

* cited by examiner

ABNORMALITY DETECTION DEVICE AND ABNORMALITY DETECTION METHOD

CROSS-REFERENCE TO RELATED APPLICATIONS

This application is a national stage under 35 U.S.C. 371 of International Patent Application No. PCT/JP2019/042581, filed Oct. 30, 2019, which claims priority to Japanese Patent Application No. 2018-211970, filed Nov. 12, 2018, the disclosures of which are incorporated herein by reference in their entirety.

TECHNICAL FIELD

The present invention relates to an abnormality detection device for detecting an abnormality in a target machine such as a bearing and the like, and an abnormality detection method for detecting an abnormality in the target machine using the abnormality detection device.

BACKGROUND ART

Known methods diagnose an abnormal phenomenon in a target machine by periodically measuring the state of the target machine such as a motor, a bearing, and the like (for example, Patent Literature 1). In the method for diagnosing the cause of the abnormal phenomenon described in Patent Literature 1, in case the target machine is the rotating device, vibration and the like are periodically measured as the state variable of the target machine. And the abnormal phenomenon in the target machine is diagnosed on the basis of the state variable and the cause variable indicating the deterioration state.

CITATION LIST

Patent Literature

Patent Literature 1: JP H7-159289 A.

SUMMARY OF INVENTION

Technical Problem

In order to detect abnormalities in a huge number of target machines in remote locations (factories and the like), acceleration sensors are attached to each target machine, and an acceleration (vibration value) of all target machines is measured periodically. In order to detect abnormalities in the target machine at an early stage, it is desirable to constantly monitor the trend data of the acceleration sensor and capture how the vibration value gradually increases, but such a method is not suitable as a method for managing a huge number of target machines. Therefore, as the method for managing a huge number of target machines, a management method such as setting a threshold value in advance and having a worker inspect the target machine exceeding the threshold value, or the like is adopted.

However, since the vibration value fluctuates greatly due to ambient temperature, changes in process load (for example, changes in revolution speed of a rotating device), and the like, false alarms increase in number if the threshold value is set strictly. On the other hand, if the threshold value is set loosely, a degree of damage to the target machine at the stage of receiving the alarm is severe, and it is often too late. That is, when monitoring numerous target machines using numerous acceleration sensors, it has been difficult to detect an abnormality in the target machine at an early stage.

It is an object of the present invention to provide an abnormality detection device and an abnormality detection method capable of detecting an abnormality in each target machine at an early stage even when managing numerous target machines.

Solution to Problem

An abnormality detection device according to this aspect detects an abnormality in a target machine, and the abnormality detection device includes a first acquisition unit that acquires a drive side temperature of the target machine, a second acquisition unit that acquires a non-drive side temperature of the target machine, a correlation storage unit that stores a correlation between the drive side temperature and the non-drive side temperature based on the drive side temperature and the non-drive side temperature during normal operation of the target machine, a detection unit that detects a deviation from the correlation stored in the correlation storage unit on the basis of the drive side temperature acquired by the first acquisition unit and the non-drive side temperature acquired by the second acquisition unit, and an output unit that outputs the deviation from the correlation detected by the detection unit as an abnormality or an abnormality indication in the target machine.

In addition, the abnormality detection device according to the aspect further includes a third acquisition unit that acquires two or more of the drive side temperatures and two or more of the non-drive side temperatures during normal operation of the target machine, and a calculation unit that determines the correlation on the basis of two or more of the drive side temperatures and two or more of the non-drive side temperatures acquired by the third acquisition unit. The correlation storage unit stores the correlation determined by the calculation unit.

In addition, in the abnormality detection device according to the aspect, the calculation unit determines at least one of a non-drive side regression value of the non-drive side temperature by simple regression analysis of the drive side temperature and a drive side regression value of the drive side temperature by simple regression analysis of the non-drive side temperature. The correlation storage unit stores at least one of the non-drive side regression value and the drive side regression value determined by the calculation unit. The detection unit detects at least one of a deviation from the correlation based on a comparison result between the non-drive side regression value stored in the correlation storage unit and a non-drive side measured value as the non-drive side temperature acquired by the second acquisition unit and a deviation from the correlation based on a comparison result between the drive side regression value stored in the correlation storage unit and a drive side measured value as the drive side temperature acquired by the first acquisition unit.

In addition, the abnormality detection device according to the aspect further includes a fourth acquisition unit that acquires a drive side vibration value of the target machine and a fifth acquisition unit that acquires a non-drive side vibration value of the target machine. The detection unit detects the deviation from the correlation on the basis of at least one of the drive side vibration value acquired by the fourth acquisition unit and the non-drive side vibration value acquired by the fifth acquisition unit.

In addition, the abnormality detection device according to the aspect further includes a determination unit that determines that the target machine has stopped operation when the drive side vibration value acquired by the fourth acquisition unit and the non-drive side vibration value acquired by the fifth acquisition unit drop by a predetermined value or more and that the target machine has resumed operation when the drive side vibration value acquired by the fourth acquisition unit and the non-drive side vibration value acquired by the fifth acquisition unit rise by a predetermined value or more while the target machine stops operation. The calculation unit excludes the drive side temperature and the non-drive side temperature acquired between time when the determination unit determines that the target machine has stopped operation and time when the determination unit determines that the target machine has resumed operation, from the drive side temperature and the non-drive side temperature during normal operation.

In addition, in the abnormality detection device according to the aspect, the calculation unit excludes the drive side temperature and the non-drive side temperature acquired during a predetermined period after the determination unit determines that the target machine has resumed operation, from the drive side temperature and the non-drive side temperature during normal operation.

In addition, in the abnormality detection device according to the aspect, the determination unit determines at least one of whether the target machine has stopped operation or the target machine has resumed operation on the basis of the drive side temperature acquired by the first acquisition unit and the non-drive side temperature acquired by the second acquisition unit.

In addition, an abnormality detection method according to the aspect detects an abnormality in a target machine by an abnormality detection device that detects the abnormality in the target machine. The abnormality detection method includes a first acquisition step in which the abnormality detection device acquires a drive side temperature of the target machine, a second acquisition step in which the abnormality detection device acquires a non-drive side temperature of the target machine, a detection step in which the abnormality detection device, on the basis of the drive side temperature acquired in the first acquisition step and the non-drive side temperature acquired in the second acquisition step, detects a deviation from a correlation between the drive side temperature and the non-drive side temperature based on the drive side temperature and the non-drive side temperature during normal operation of the target machine, and an output step in which the abnormality detection device outputs the deviation from the correlation as an abnormality or an abnormality indication in the target machine.

In addition, the abnormality detection method according to the aspect further includes a third acquisition step of acquiring two or more of the drive side temperatures and two or more of the non-drive side temperatures during normal operation of the target machine, a calculation step of determining the correlation on the basis of two or more of the drive side temperatures and two or more of the non-drive side temperatures acquired in the third acquisition step, and a correlation storage step of storing the correlation determined in the calculation step.

In addition, in the abnormality detection method according to the aspect, the calculation step includes determining at least one of a non-drive side regression value of the non-drive side temperature by simple regression analysis of the drive side temperature and a drive side regression value of the drive side temperature by simple regression analysis of the non-drive side temperature. The detection step includes detecting at least one of a deviation from the correlation based on a comparison result between the non-drive side regression value and a non-drive side measured value as the non-drive side temperature and a deviation from the correlation based on a comparison result between the drive side regression value and a drive side measured value as the drive side temperature.

In addition, the abnormality detection method according to the aspect further includes a fourth acquisition step of acquiring a drive side vibration value of the target machine and a fifth acquisition step of acquiring a non-drive side vibration value of the target machine. The detection step includes detecting the deviation from the correlation is detected on the basis of at least one of the drive side vibration value and the non-drive side vibration value.

In addition, the abnormality detection method according to the aspect further includes a determination step of determining that the target machine has stopped operation when the drive side vibration value and the non-drive side vibration value drop by a predetermined value or more and determining that the target machine has resumed operation when the drive side vibration value and the non-drive side vibration value rise by a predetermined value or more while the target machine stops operation. The calculation step excludes the drive side temperature and the non-drive side temperature acquired between time when it is determined in the determination step that the target machine has stopped operation and time when it is determined in the determination step that the target machine has resumed operation, from the drive side temperature and the non-drive side temperature during normal operation.

In addition, in the abnormality detection method according to the aspect, the calculation step excludes the drive side temperature and the non-drive side temperature acquired during a predetermined period after it is determined in the determination step that the target machine has resumed operation, from the drive side temperature and the non-drive side temperature during normal operation.

In addition, in the abnormality detection method according to the aspect, the determination step includes determining at least one of whether the target machine has stopped operation or the target machine has resumed operation on the basis of the drive side temperature and the non-drive side temperature.

Advantageous Effects of Invention

According to the present invention, it is possible to provide an abnormality detection device and an abnormality detection method capable of detecting an abnormality in each target machine at an early stage even when managing numerous target machines.

DESCRIPTION OF EMBODIMENT

Figure 1:
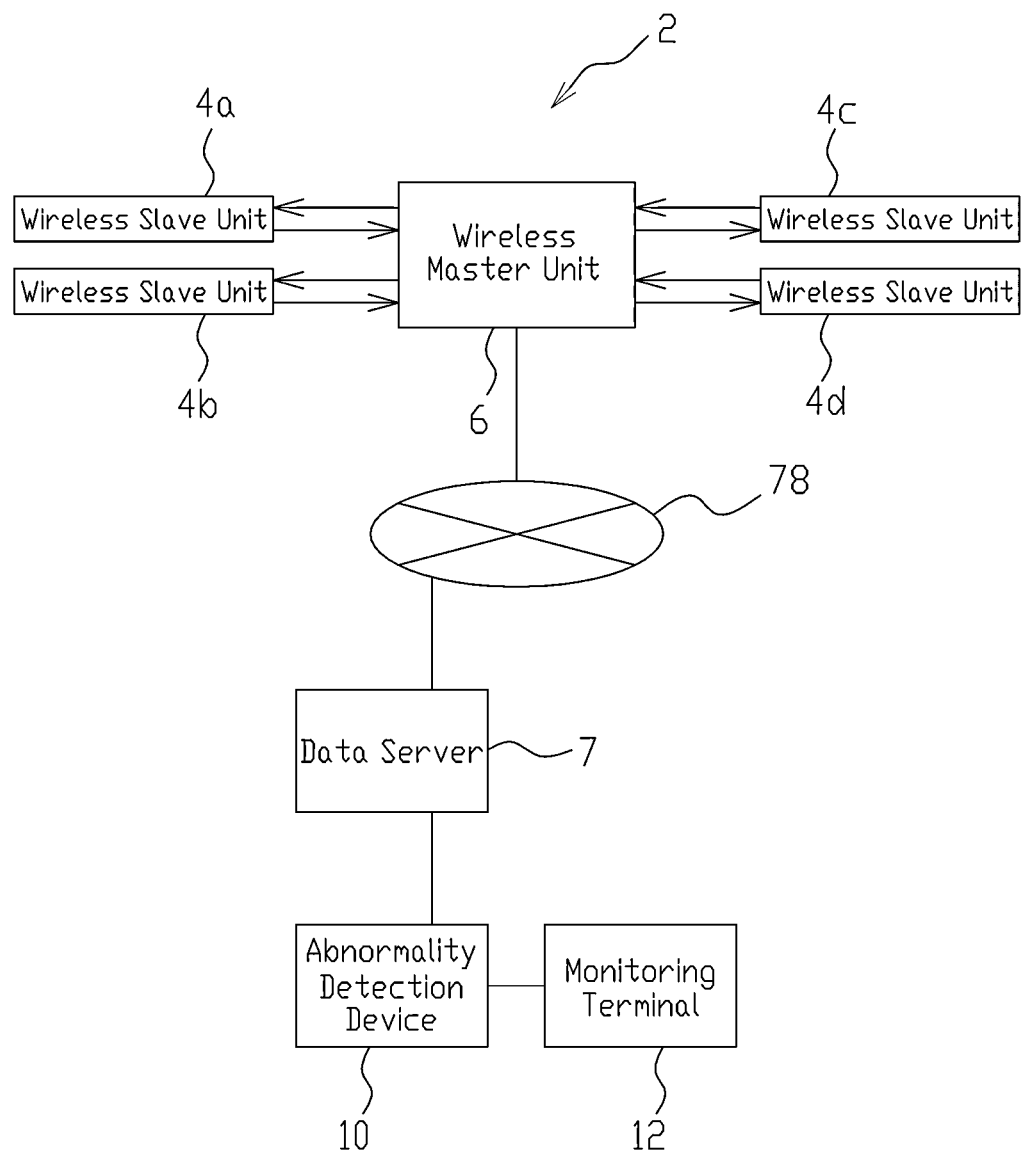
FIG. 1 is a block diagram illustrating a configuration of an abnormality detection system according to an embodiment.

Hereinafter, an abnormality detection system according to an embodiment of the present invention will be described with reference to the drawings. FIG. 1 is a block diagram illustrating a configuration of the abnormality detection system according to the present embodiment. The abnormality detection system 2 according to the present embodiment is a system for detecting an abnormality in a target machine such as a motor, a fan, and the like. As illustrated in FIG. 1, the abnormality detection system 2 includes a plurality of wireless slave units 4a to 4d, a wireless master unit 6, a data server 7, an abnormality detection device 10, and a monitoring terminal 12. The wireless slave units 4a to 4d are arranged in a communication area over which the wireless master unit 6 has jurisdiction. In addition, the wireless master unit 6 and the data server 7 are connected to each other by a network 78.

FIG. 1 illustrates a case in which four wireless slave units 4a to 4d are wirelessly connected to the wireless master unit 6 as an example for convenience of explanation, but actually a plurality of several hundred or more wireless slave units are wirelessly connected to the wireless master unit 6. In addition, in FIG. 1, a case in which the wireless slave units 4a to 4d are directly connected to the wireless master unit 6 wirelessly is illustrated as an example, but the wireless slave units 4a to 4d may be connected to the wireless master unit 6 wirelessly via a relay unit or the like. In addition, in FIG. 1, a case in which one wireless master unit 6 is connected to one data server 7 by the network 78 is illustrated as an example, but actually two or more of the wireless master units (with different communication areas over which each wireless master unit has jurisdiction) 6 are connected to one data server 7 by the network 78. In addition, in FIG. 1, while one monitoring terminal 12 is included, a configuration in which two or more of the monitoring terminals 12 are included may be possible.

Figure 2:
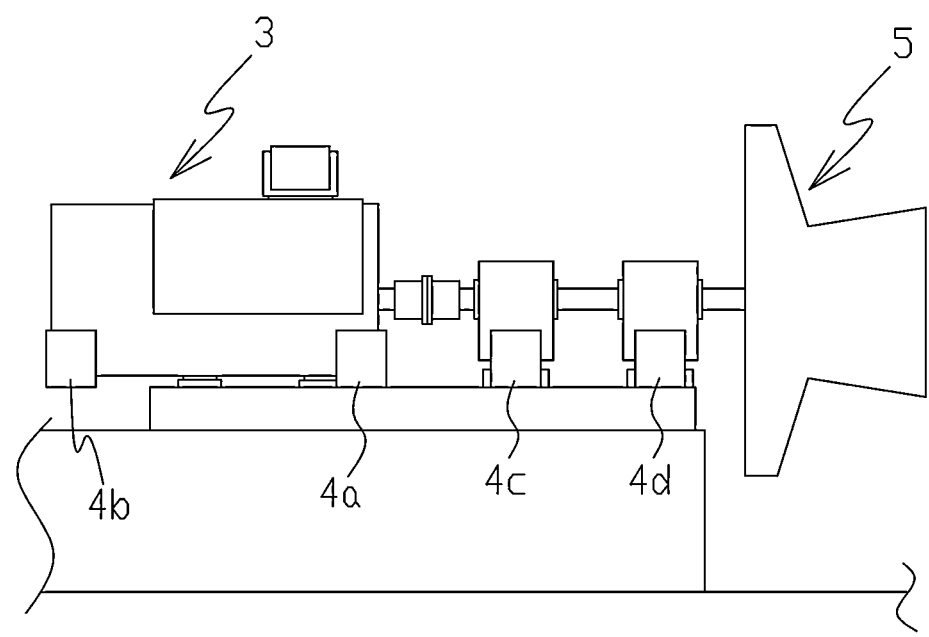
FIG. 2 is a diagram illustrating an example of positions to which wireless slave units are attached according to an embodiment.

The wireless slave units 4a to 4d are attached to predetermined positions on the target machine. FIG. 2 is a diagram illustrating an example of positions to which the wireless slave units 4a to 4d are attached. As illustrated in FIG. 2, the wireless slave unit 4a is attached to an inboard bearing of a motor 3, the wireless slave unit 4b is attached to an outboard bearing of the motor 3, the wireless slave unit 4c is attached to a motor side bearing of a fan 5, and the wireless slave unit 4d is attached to a fan side bearing of the fan 5. The wireless slave unit 4a measures a temperature and vibration value of the inboard bearing of the motor 3. The wireless slave unit 4b measures a temperature and vibration value of the outboard bearing of the motor 3. The wireless slave unit 4c measures a temperature and vibration value of the motor side bearing of the fan 5. The wireless slave unit 4d measures a temperature and vibration value of the fan side bearing of the fan 5. The target machines are, for example, the motor 3 and the fan 5 as illustrated in FIG. 2, but another machine (for example, a machine installed at a plant or the like) capable of monitoring an operating condition by measuring a value using a temperature sensor, an acceleration sensor, or the like may be used.

Figure 3:
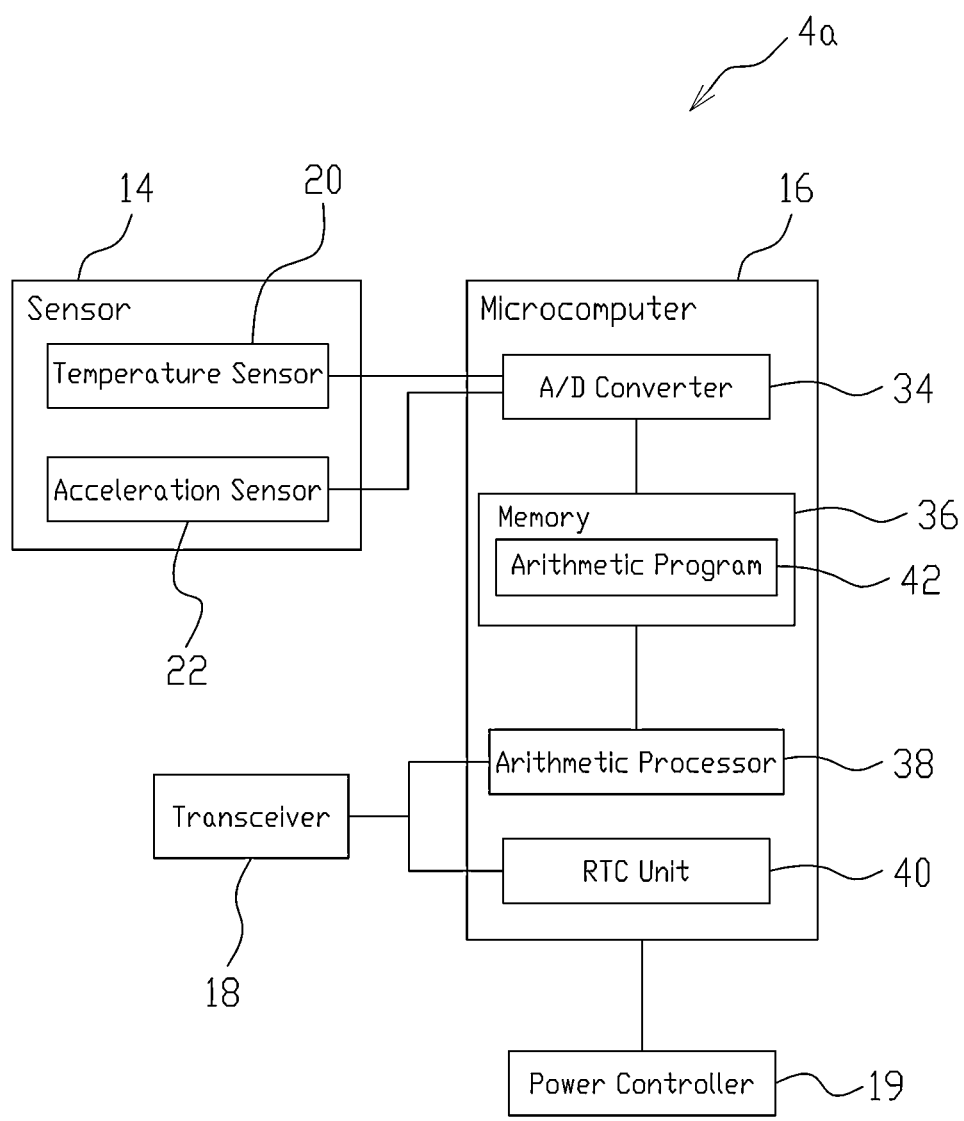
FIG. 3 is a block diagram illustrating a configuration of the wireless slave unit according to an embodiment.

FIG. 3 is a block diagram for explaining a configuration of the wireless slave unit 4a. As illustrated in FIG. 3, the wireless slave unit 4a includes a sensor 14, a microcomputer 16, a transceiver 18, and a power controller 19. The sensor 14 includes a temperature sensor 20 and an acceleration sensor 22. The temperature sensor 20 measures a temperature of the target machine (the inboard bearing of the motor 3), and the acceleration sensor 22 measures a vibration value of the target machine (the inboard bearing of the motor 3).

The microcomputer 16 comprehensively controls each unit in the wireless slave unit 4a and includes an A/D converter 34, a memory 36, an arithmetic processor 38, and an RTC unit 40 as illustrated in FIG. 3. The A/D converter 34 converts measured values measured by the temperature sensor 20 and the acceleration sensor 22 from analog signals to digital signals. The A/D converter 34 outputs the measured values converted into the digital signals to the memory 36. The memory 36 stores a measured value for arithmetic processing by the arithmetic processor 38 and an arithmetic program 42 for arithmetic processing by the arithmetic processor 38.

The arithmetic processor 38 reads the measured values and the arithmetic program 42 stored in the memory 36, samples the measured values from the temperature sensor 20 and the acceleration sensor 22, and performs an arithmetic process on the measured values. As arithmetic processing, the arithmetic processor 38 calculates arithmetic values such as an average value of the measured values from the temperature sensor 20 and the acceleration sensor 22 and the like for example. The RTC unit 40 is a real-time clock that measures the time. The transceiver 18 receives various information from the wireless master unit 6 and transmits the calculated values (the temperature and vibration value) calculated by the arithmetic processor 38 to the wireless master unit 6. The power controller 19 includes a battery (not illustrated in the drawings) and controls supplying power to the wireless slave unit 4a.

The configuration of the wireless slave units 4b to 4d is the same as the configuration of the wireless slave units 4a. Therefore, for the configuration of the wireless slave units 4b to 4d same as the configuration of the wireless slave unit 4a, the same reference numerals as those used in the description of the wireless slave unit 4a are used, and the description thereof is omitted.

Figure 4:
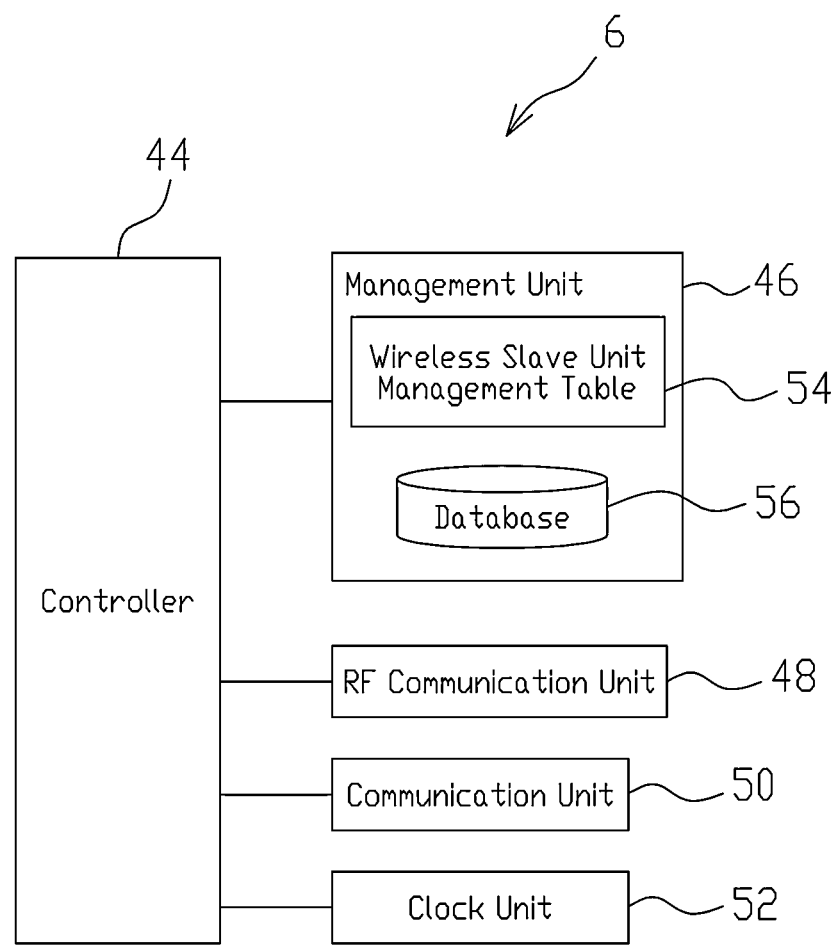
FIG. 4 is a block diagram illustrating a configuration of a wireless master unit according to an embodiment.

Next, a configuration of the wireless master unit 6 will be described. FIG. 4 is a block diagram for explaining the configuration of the wireless master unit 6. The wireless master unit 6 has jurisdiction over a predetermined communication area. The wireless master unit 6, as illustrated in FIG. 4, includes a controller 44 that comprehensively controls each unit in the wireless master unit 6. A management unit 46, an RF communication unit 48, a communication unit 50, and a clock unit 52 that keeps time are connected to the controller 44.

As illustrated in FIG. 4, the management unit 46 includes and manages a wireless slave unit management table 54 and a database 56. The wireless slave unit management table 54 stores identification numbers and the like for each of the wireless slave units 4a to 4d. In the database 56, the calculated values (the temperature and vibration values) acquired from the wireless slave units 4a to 4c via the RF communication unit 48 are temporarily stored. The RF communication unit 48 controls communication between the wireless master unit 6 and the wireless slave units 4a to 4d.

The RF communication unit 48 transmits various information managed by the management unit 46 to the wireless slave units 4a to 4d. In addition, the RF communication unit 48 receives the calculated values (the temperature and vibration value) transmitted from each of the wireless slave units 4a to 4d. The communication unit 50 outputs various information stored in the wireless slave unit management table 54 to the data server 7. In addition, the communication unit 50 outputs the calculated values (the temperature and vibration value) from the wireless slave units 4a to 4d stored in the database 56 to the data server 7.

Figure 5:
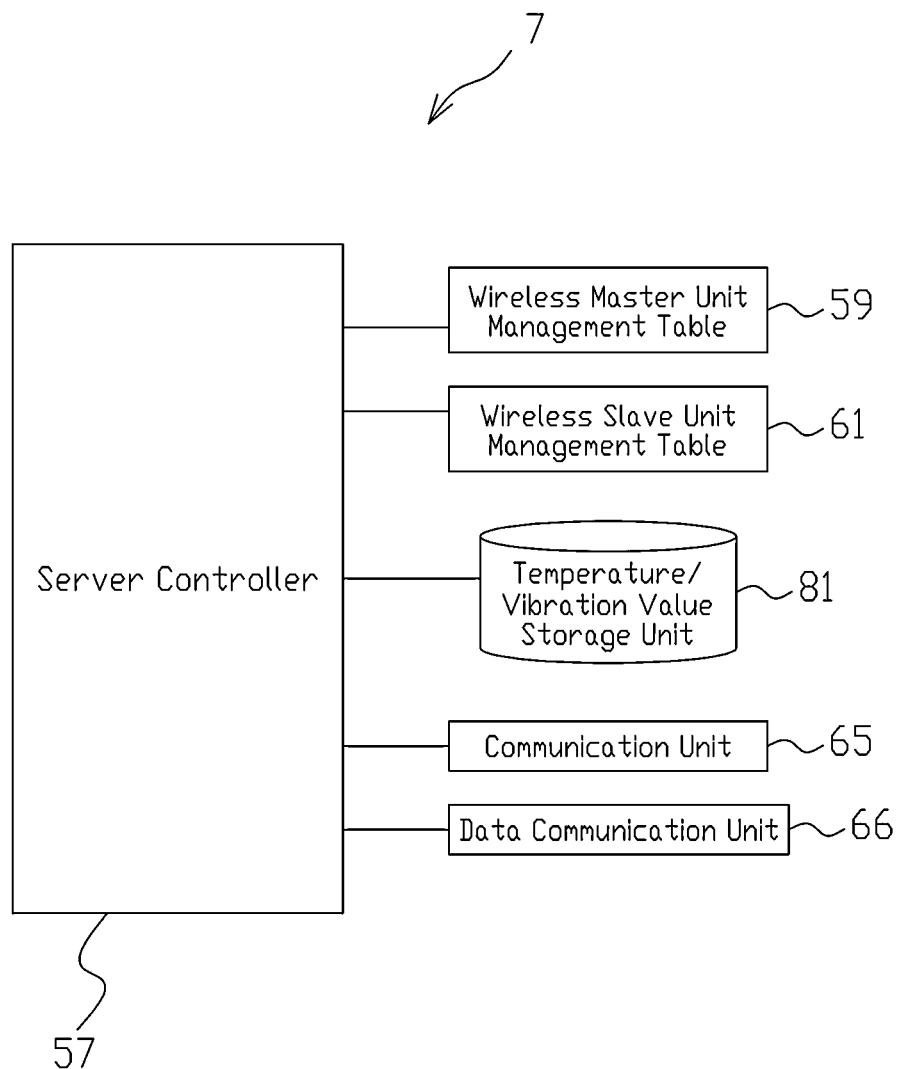
FIG. 5 is a block diagram illustrating a configuration of a data server according to an embodiment.

Next, a configuration of the data server 7 will be described. FIG. 5 is a block diagram illustrating the configuration of the data server 7. As illustrated in FIG. 5, the data server 7 includes a server controller 57 that comprehensively controls each unit in the data server 7. A wireless master unit management table 59, a wireless slave unit management table 61, a temperature/vibration value storage unit 81, a communication unit 65, and the data communication unit 66 are connected to the server controller 57. The wireless master unit management table 59 stores an identification number, IP address, name, installation location, communication group ID, wireless communication channel and the like of the wireless master unit 6. The wireless slave unit management table 61 stores identification numbers and the like for each of the wireless slave units 4a to 4d.

The temperature/vibration value storage unit 81 chronologically stores a temperature of the inboard bearing (hereinafter referred to as a drive side temperature) and a temperature of the outboard bearing (hereinafter referred to as a non-drive side temperature) of the motor 3 acquired from the wireless master unit 6 in the past. The temperature/vibration value storage unit 81 also chronologically stores a motor side bearing temperature (hereinafter referred to as a motor side temperature) and a fan side bearing temperature (hereinafter referred to as a fan side temperature) of the fan 5 acquired from the wireless master unit 6 in the past. In addition, the temperature/vibration value storage unit 81 chronologically stores a vibration value of the inboard bearing (hereinafter referred to as a drive side vibration value) and a vibration value of the outboard bearing (hereinafter referred to as non-drive side vibration value) of the motor 3 acquired from the wireless master unit 6 in the past. The temperature/vibration value storage unit 81 also chronologically stores a motor side bearing vibration value (hereinafter referred to as a motor side vibration value) and a fan side bearing vibration value (hereinafter referred to as a fan side vibration value) of the fan 5 acquired from the wireless master unit 6 in the past.

The communication unit 65 is connected to the network 78 and communicates with the wireless master unit 6 via the network 78. The communication unit 65 transmits a request for transmitting measurement data to the wireless master unit 6 at a predetermined interval for example and receives the calculated values (the temperature and vibration value) of the wireless slave units 4a to 4d from the wireless master unit 6. The data communication unit 66 is connected to the data communication unit 68 of the abnormality detection device 10 and communicates with the abnormality detection device 10. The data communication unit 66 transmits the calculated values (the temperature and vibration value) of the wireless slave units 4a to 4d acquired from the wireless master unit 6 to the abnormality detection device 10.

Figure 6:
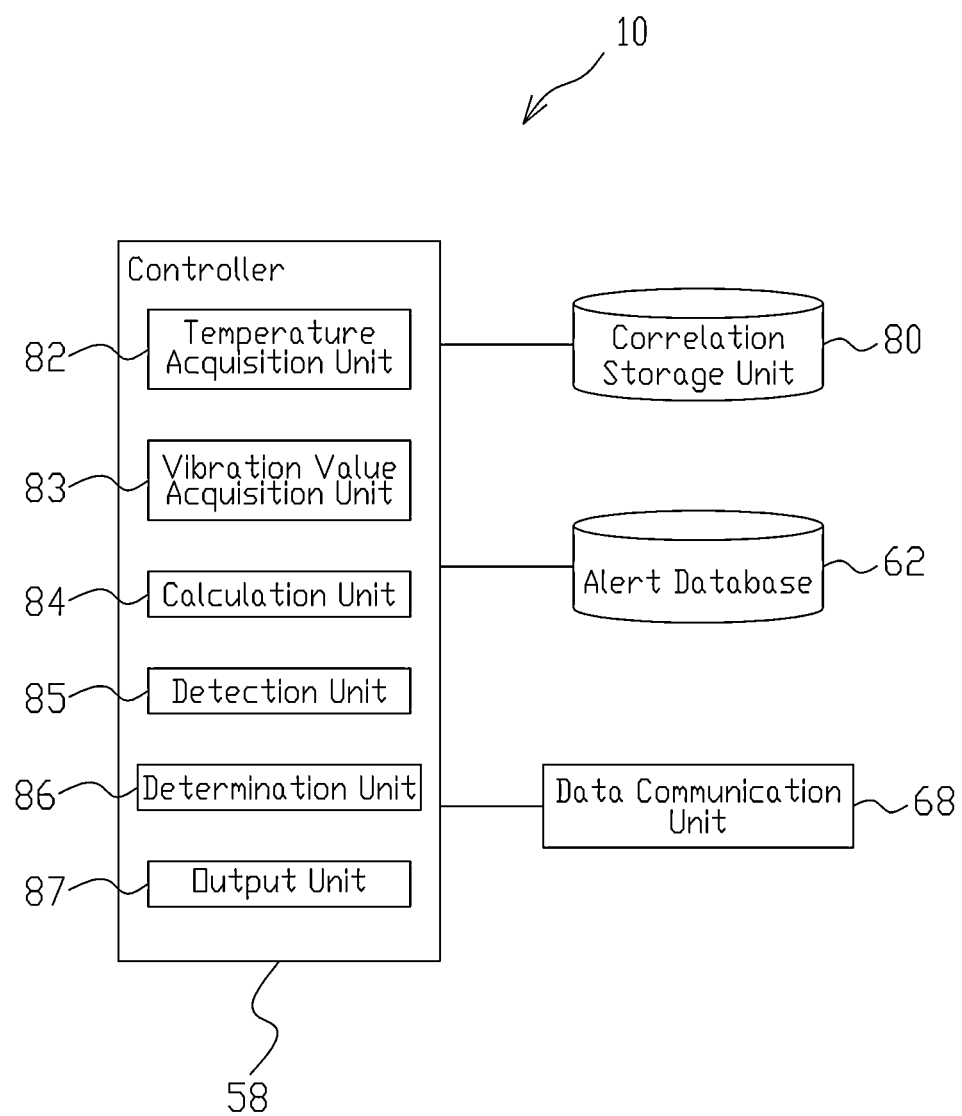
FIG. 6 is a block diagram illustrating a configuration of an abnormality detection device according to an embodiment.

Next, a configuration of the abnormality detection device 10 will be described. As illustrated in FIG. 1, the abnormality detection device 10 is connected to the data server 7 and the monitoring terminal 12 wirelessly or via a wired line. FIG. 6 is a block diagram illustrating the configuration of the abnormality detection device 10. The abnormality detection device 10 is a device for detecting the abnormality in the target machine and includes a controller 58 that comprehensively controls each unit in the abnormality detection device 10 as illustrated in FIG. 6. A correlation storage unit 80, an alarm database 62, and a data communication unit 68 are connected to the controller 58.

The correlation storage unit 80 stores a correlation between the drive side temperature and the non-drive side temperature of the motor 3 based on the drive side temperature and the non-drive side temperature of the motor 3 during normal operation of the target machine (hereinafter referred to as a correlation of the motor 3). The correlation storage unit 80 also stores a correlation between the motor side temperature and the fan side temperature of the fan 5 based on the motor side temperature and the fan side temperature of the fan 5 during normal operation of the target machine (hereinafter referred to as a correlation of the fan 5). That is, the correlation storage unit 80 stores the correlation of the motor 3 and the correlation of the fan 5 determined by the calculation unit 84. The correlation will be described later.

The alarm database 62 stores a deviation from the correlation of the motor 3 detected by the detection unit 85 as information on an abnormality or an abnormality indication in the motor 3. The alarm database 62 also stores a deviation from the correlation of the fan 5 detected by the detection unit 85 as information on an abnormality or an abnormality indication in the fan 5.

The data communication unit 68 is connected to the data communication unit 66 of the data server 7 and the data communication unit 72 of the monitoring terminal 12. The data communication unit 68 communicates with the data server 7 and the monitoring terminal 12. The data communication unit 68 receives information on the temperature and vibration value of the motor 3 from the data server 7. The data communication unit 68 also receives information on the temperature and vibration value of the fan 5 from the data server 7. In addition, the data communication unit 68 receives information on the wireless slave unit management table 61 and a request for acquiring information on the wireless slave unit management table 61 and information on an abnormality or an abnormality indication in the target machine from the monitoring terminal 12. The data communication unit 68 transmits the information on the abnormality or abnormality indication in the target machine to the monitoring terminal 12.

The controller 58 includes a temperature acquisition unit 82, a vibration value acquisition unit 83, a calculation unit 84, a detection unit 85, a determination unit 86, and an output unit 87. The temperature acquisition unit 82 acquires, via the data communication unit 68, the drive side temperature and the non-drive side temperature of the motor 3 output from the communication unit 50 of the wireless master unit 6 and the motor side temperature and the fan side temperature of the fan 5 (the temperatures measured by the wireless slave units 4a to 4d). The vibration value acquisition unit 83 acquires, via the data communication unit 68, the drive side vibration value and the non-drive side vibration value of the motor 3 output from the communication unit 50 of the wireless master unit 6 and the motor side vibration value and the fan side vibration value of the fan 5 (the vibration values measured by the wireless slave units 4a to 4d).

The calculation unit 84 determines the correlation of the motor 3 on the basis of the drive side temperature and the non-drive side temperature of the motor 3 during normal operation of the target machine acquired from the data server 7. In addition, the calculation unit 84 determines the correlation of the fan 5 on the basis of the motor side temperature and the fan side temperature of the fan 5 during normal operation of the target machine acquired from the data server 7.

Figure 7:
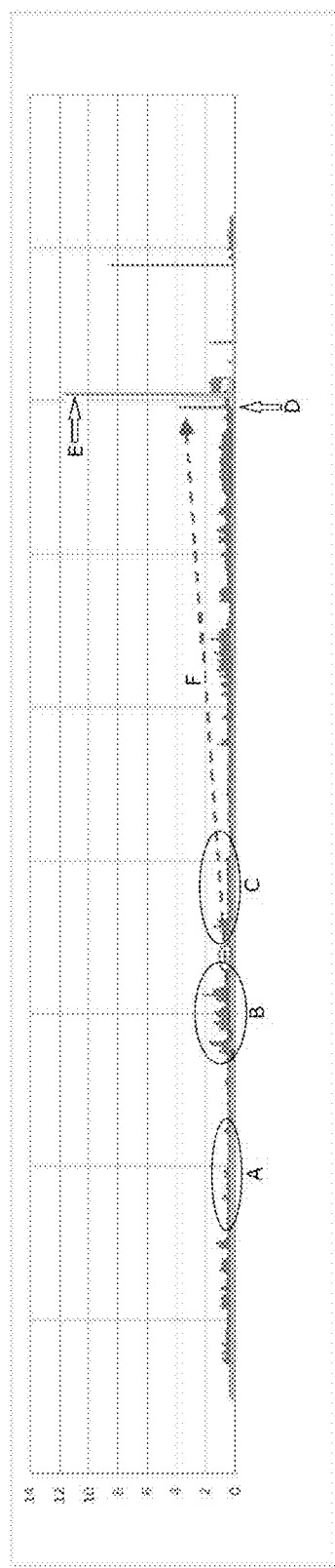
FIG. 7 is a graph illustrating an example of a trend of a vibration value of a target machine according to an embodiment.

Hereinafter, specific processes of the controller 58 (the temperature acquisition unit 82, the calculation unit 84, and the detection unit 85) will be described using a case in which the motor 3 and the fan 5 indicate a trend of the vibration value as illustrated in FIG. 7 as an example. In the trend of the vibration value illustrated in FIG. 7, the vibration values are stable in period A (when the motor 3 operates normally), the vibration value starts increasing gradually from the beginning of period B, and the vibration value also keeps increasing gradually in period C. It is determined that the vibration value exceeds a threshold value indicating the abnormality in the motor 3 at point D, and the vibration value indicates the highest value at point E (when the motor 3 fails).

The temperature acquisition unit 82 acquires data on the drive side temperature and the non-drive side temperature of the motor 3 during normal operation of the target machine (period A illustrated in FIG. 7) stored in the temperature/vibration value storage unit 81 of the data server 7, that is, data on two or more of the drive side temperatures and the non-drive side temperatures measured during period A illustrated in FIG. 7. Similarly, the temperature acquisition unit 82 acquires data on the motor side temperature and the fan side temperature of the fan 5 during normal operation of the target machine (period A illustrated in FIG. 7) stored in the temperature/vibration value storage unit 81 of the data server 7, that is, two or more of the motor side temperatures and the fan side temperatures measured during period A illustrated in FIG. 7.

Figure 8:
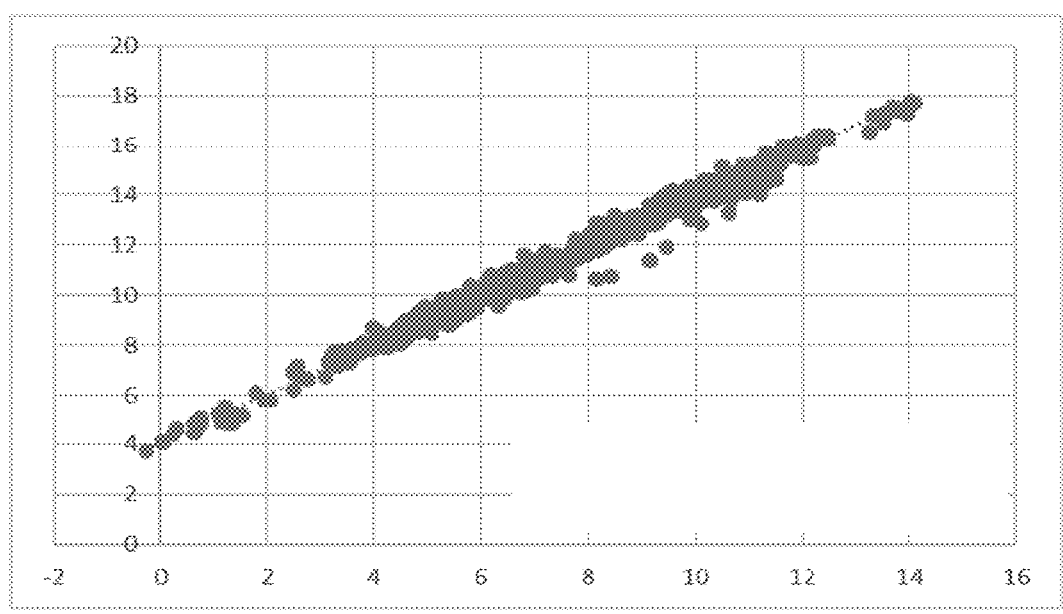
FIG. 8 is a graph illustrating an example of a correlation between a drive side temperature and a non-drive side temperature according to an embodiment.

On the basis of the data on the drive side temperature and the non-drive side temperature of the motor 3 acquired by the temperature acquisition unit 82 during normal operation of the target machine (period A illustrated in FIG. 7), the calculation unit 84 creates a graph with a horizontal axis as the non-drive side temperature of the motor 3 and a vertical axis as the drive side temperature of the motor 3 as illustrated in FIG. 8. The data on the temperature of the motor 3 during normal operation is data on two or more of the drive side temperatures and the non-drive side temperatures measured during period A illustrated in FIG. 7. The calculation unit 84 determines that there is a simple regression correlation between the non-drive side temperature and the drive side temperature (a dotted line illustrated in FIG. 8) during normal operation of the motor 3 by creating the graph. The correlation of the motor 3 determined by the calculation unit 84 is stored in the correlation storage unit 80.

Note that the calculation unit 84 excludes the drive side temperature and the non-drive side temperature acquired during the period between the time when the determination unit 86 determines that the motor 3 has stopped operation and the time when the determination unit 86 determines that the motor 3 has resumed operation, from the drive side temperature and the non-drive side temperature during normal operation. Also, the calculation unit 84 excludes the drive side temperature and the non-drive side temperature acquired during a predetermined period after the determination unit 86 determines that the motor 3 has resumed operation, from the drive side temperature and the non-drive side temperature during normal operation. That is, the calculation unit 84 excludes all data on the drive side temperature and the non-drive side temperature measured during a period from the time when the motor 3 has stopped operation to the time when the predetermined period expires after the motor 3 resumes operation, from data for determining the correlation of the motor 3.

Similarly, the calculation unit 84 creates a graph with a horizontal axis as the fan side temperature of the fan 5 and a vertical axis as the motor side temperature of the fan 5 to determine that there is a simple regression correlation between the fan side temperature and the motor side temperature during normal operation of the fan 5. The correlation of the fan 5 determined by the calculation unit 84 is stored in the correlation storage unit 80. In addition, the calculation unit 84 excludes the motor side temperature and the fan side temperature acquired during the period between the time when the determination unit 86 determines that the fan 5 has stopped operation and the time when the determination unit 86 determines that the fan 5 has resumed operation, from the motor side temperature and the fan side temperature during normal operation. Also, the calculation unit 84 excludes the motor side temperature and the fan side temperature acquired during a predetermined period after the determination unit 86 determines that the fan 5 has resumed operation, from the motor side temperature and the fan side temperature during normal operation. That is, the calculation unit 84 excludes all data on the motor side temperature and the fan side temperature measured during a period from the time when the fan 5 has stopped operation to the time when the predetermined period expires after the fan 5 resumes operation from data for determining the correlation of the fan 5. The determination of the operation stop of the target machine and the operation resumption of the target machine by the determination unit 86 will be described later.

Figure 9:
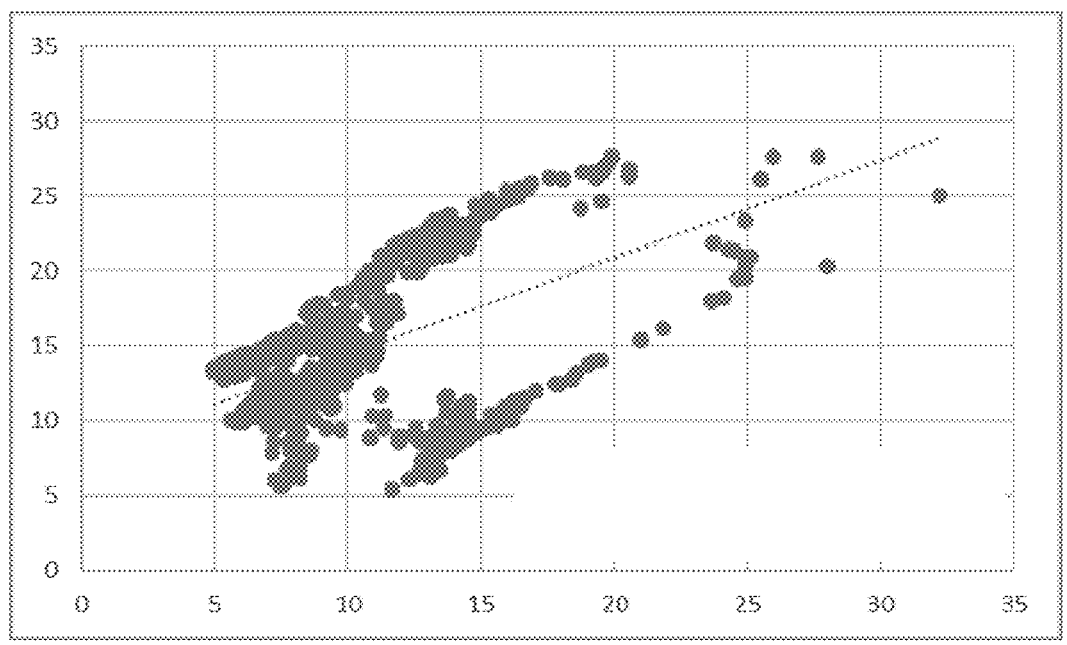
FIG. 9 is a graph illustrating an example of a relationship between the drive side temperature and the non-drive side temperature according to an embodiment.

The detection unit 85 detects the deviation from the correlation of the motor 3 determined by the calculation unit 84 and stored in the correlation storage unit 80 on the basis of the drive side temperature and the non-drive side temperature of the motor 3 acquired by the temperature acquisition unit 82. For example, on the basis of the drive side temperature and the non-drive side temperature of the motor 3 in period B illustrated in FIG. 7, the detection unit 85 creates a graph with a horizontal axis as the non-drive side temperature of the motor 3 and a vertical axis as the drive side temperature of the motor 3 as illustrated in FIG. 9. Then, the detection unit 85 compares with the correlation of the motor 3 (a dotted line illustrated in FIG. 9) stored in the correlation storage unit 80. As illustrated in FIG. 9, since the graph deviates largely from the dotted line, the detection unit 85 determines that there is the deviation from the correlation of the motor 3 in period B illustrated in FIG. 7.

Figure 10:
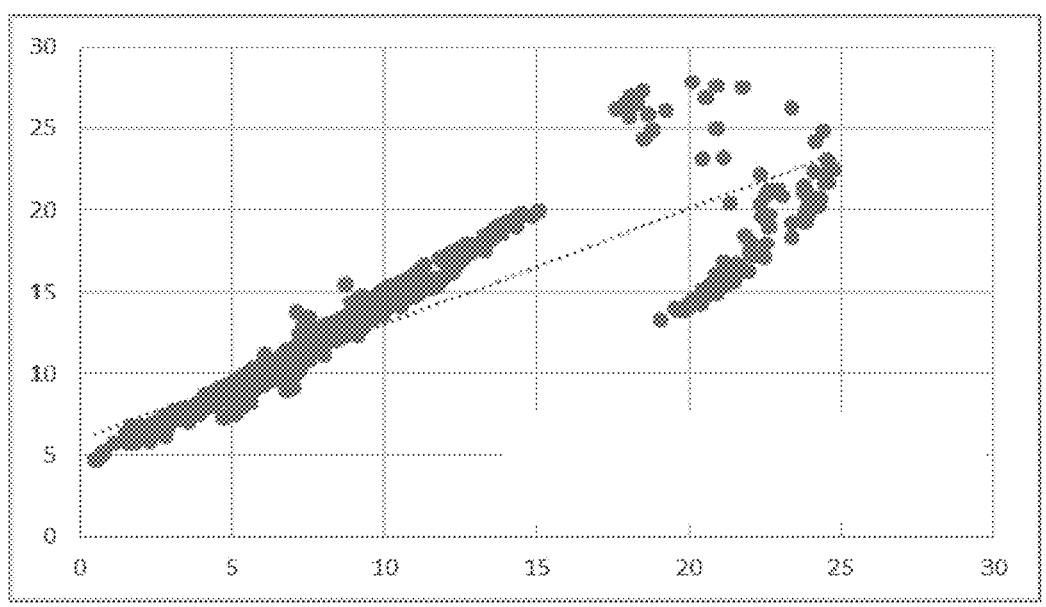
FIG. 10 is a graph illustrating an example of a relationship between the drive side temperature and the non-drive side temperature according to an embodiment.

In addition, for example, on the basis of the drive side temperature and the non-drive side temperature of the motor 3 at period C illustrated in FIG. 7, the detection unit 85 creates a graph with a horizontal axis as the non-drive side temperature of the motor 3 and a vertical axis as the drive side temperature of the motor 3 as illustrated in FIG. 10. Then, the detection unit 85 compares with the correlation of the motor 3 (a dotted line illustrated in FIG. 10) stored in the correlation storage unit 80. As illustrated in FIG. 10, since a part of the graph deviates largely from the dotted line, the detection unit 85 determines that there is the deviation from the correlation of the motor 3 at period C illustrated in FIG. 7.

Similarly, the detection unit 85 detects the deviation from the correlation of the fan 5 determined by the calculation unit 84 and stored in the correlation storage unit 80 on the basis of the motor side temperature and the fan side temperature of the fan 5 acquired by the temperature acquisition unit 82.

In addition, the detection unit 85 may detect the deviation from the correlation of the motor 3 on the basis of at least one of the drive side vibration value and the non-drive side vibration value of the motor 3, in addition to the drive side temperature and the non-drive side temperature of the motor 3. For example, when the detection unit 85 determines that there is the deviation from the correlation of the motor 3 on the basis of the drive side temperature and the non-drive side temperature of the motor 3, the detection unit 85 further refers to the drive side vibration value and the non-drive side vibration value of the motor 3. On the basis of an increase or decrease of at least one of the drive side vibration value and the non-drive side vibration value of the motor 3, the detection unit 85 determines whether or not the deviation from the correlation of the motor 3 corresponds to an abnormality or an abnormality indication.

Similarly, the detection unit 85 detects the deviation from the correlation of the fan 5 on the basis of at least one of the motor side vibration value and the fan side vibration value of the fan 5 acquired by the vibration value acquisition unit 83. That is, the detection unit 85 detects the deviation from the correlation of the fan 5 on the basis of the motor side temperature and the fan side temperature of the fan 5 and on the basis of the motor side vibration value and the fan side vibration value of the fan 5.

When the drive side vibration value and the non-drive side vibration value of the motor 3 acquired by the vibration value acquisition unit 83 drop by a predetermined value or more, the determination unit 86 determines that the motor 3 has stopped operation. When the drive side vibration value and the non-drive side vibration value of the motor 3 acquired by the vibration value acquisition unit 83 rise by the predetermined value or more while the motor 3 stops operation, the determination unit 86 determines that the motor 3 has resumed operation. That is, in case the drive side vibration value and the non-drive side vibration value of the motor 3 drop extremely (i.e., in case the vibration values become approximately 0) at almost the same time (at the same timing), the determination unit 86 determines that the case is caused by a shutdown of the motor 3. In addition, in case the drive side vibration value and the non-drive side vibration value of the motor 3 rise extremely (i.e., in case the motor starts vibrating) at almost the same time (at the same timing) while the motor 3 stops operation, the determination unit 86 determines that the case is caused by a resume of the motor 3.

Similarly, when the motor side vibration value and the fan side vibration value of the fan 5 acquired by the vibration value acquisition unit 83 drop by a predetermined value or more, the determination unit 86 determines that the fan 5 has stopped operation. When the motor side vibration value and the fan side vibration value of the fan 5 acquired by the vibration value acquisition unit 83 rise by the predetermined value or more after the fan 5 stops operation, the determination unit 86 determines that the fan 5 has resumed operation. Note that, as described above, the calculation unit 84 acquires the result determined by the determination unit 86. Then, the calculation unit 84 excludes the drive side temperature and the non-drive side temperature acquired between the time when the motor 3 stops operation and the time when the predetermined period expires after the motor 3 resumes operation, from the drive side temperature and the non-drive side temperature during normal operation. Also, the calculation unit 84 excludes the motor side temperature and the fan side temperature acquired between the time when the fan 5 stops operation and the time when the predetermined period expires after the fan 5 resumes operation, from the motor side temperature and the fan side temperature during normal operation.

When the output unit 87 receives a request for acquiring information regarding the abnormality or the abnormality indication in the target machine from the monitoring terminal 12 via the data communication unit 68, the output unit 87 outputs the deviation from the correlation detected by the detection unit 85 and stored in the alarm database 62 to the data communication unit 68 as the information on the abnormality or abnormality indication in the target machine.

Figure 11:
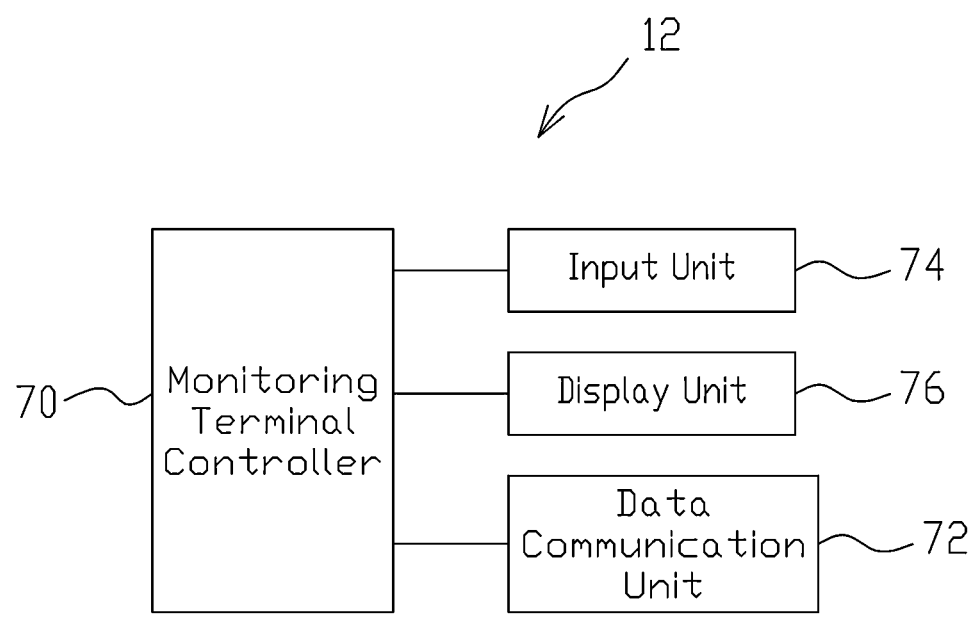
FIG. 11 is a block diagram illustrating a configuration of a monitoring terminal according to an embodiment.

Next, a configuration of the monitoring terminal 12 will be described. As illustrated in FIG. 1, the monitoring terminal 12 is connected to the abnormality detection device 10 wirelessly or via a wired line. FIG. 11 is a block diagram illustrating the configuration of the monitoring terminal 12. As illustrated in FIG. 11, the monitoring terminal 12 includes a monitoring terminal controller 70 that comprehensively controls each unit in the monitoring terminal 12. A data communication unit 72, an input unit 74, and a display unit 76 are connected to the monitoring terminal controller 70.

The data communication unit 72 communicates with the data communication unit 68 in the abnormality detection device 10. The data communication unit 72 transmits the information on the wireless slave unit management table 61, the request for acquiring the temperature and vibration value of the target machine, and the request for acquiring the information on the abnormality or the abnormality indication in the target machine to the abnormality detection device 10. The data communication unit 72 receives the temperature and vibration value of the target machine, the information on the abnormality or the abnormality indication in the target machine, and the like from the abnormality detection device 10.

The input unit 74 is, for example, an input device such as a keyboard, a mouse, or the like. The display unit 76 is a display device such as a liquid crystal panel or the like. In case the liquid crystal panel is composed of a touch panel, the input device and the display device are integrated into a single device. The input unit 74 outputs an input result input by a user of the monitoring terminal 12 to the monitoring terminal controller 70.

The display unit 76 displays the information on the wireless master unit 6 stored in the wireless master unit management table 59 in the data server 7. The display unit 76 displays the information on the wireless slave units 4a to 4d stored in the wireless slave unit management table 61 in the data server 7. The display unit 76 displays the information on the correlation stored in the correlation storage unit 80 in the abnormality detection device 10. The display unit 76 displays the information on the temperature and vibration value stored in the temperature/vibration value storage unit 81 in the data server 7, and the information on the abnormality or abnormality indication stored in the alarm database 62 in the abnormality detection device 10. Specifically, the display unit 76 displays a graph (for example, the graphs illustrated in FIGS. 8 to 10) and a table based on the correlation, a graph (for example, the graph illustrated in FIG. 7) and a table based on the temperature and vibration value, an alarm message based on the information on the abnormality or abnormality indication, and the like.

Figure 12:
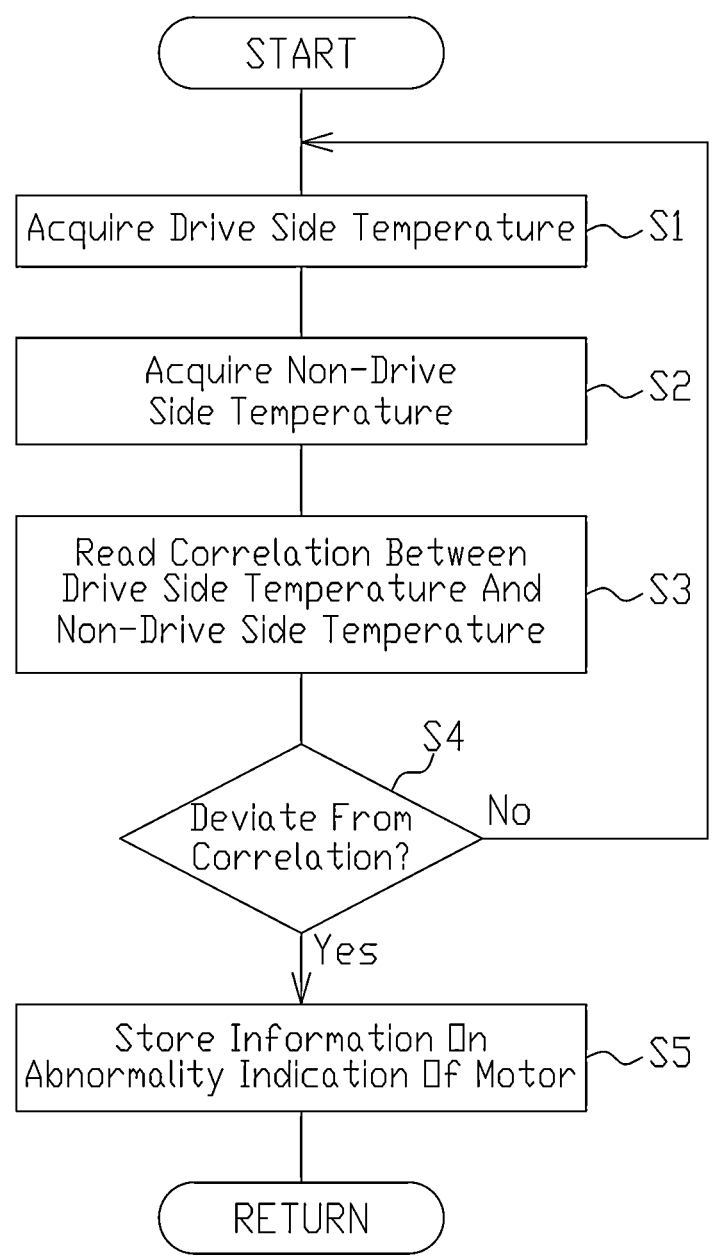
FIG. 12 is a flowchart explaining a process in which the abnormality detection device detects an abnormality in the target machine according to an embodiment.

Next, with reference to the drawings, an abnormality detection method for detecting the abnormality or the abnormality indication in the target machine using the abnormality detection device 10 according to the present embodiment will be described. FIG. 12 is a flowchart for explaining a process in which the controller 58 in the abnormality detection device 10 detects the abnormality indication in the target machine (the motor 3).

The controller 58 acquires the drive side temperature and the non-drive side temperature of the motor 3. Specifically, the temperature acquisition unit 82 in the controller 58 acquires the drive side temperature of the motor 3 measured by the temperature sensor 20 in the wireless slave unit 4a and transmitted via the wireless master unit 6, from the data server 7 via the data communication unit 68 (step S1). Similarly, the temperature acquisition unit 82 acquires the non-drive side temperature of the motor 3 measured by the temperature sensor 20 of the wireless slave unit 4b and transmitted via the wireless master unit 6, from the data server 7 via the data communication unit 68 (step S2).

Next, on the basis of the drive side temperature acquired in step S1 and the non-drive side temperature acquired in step S2, the controller 58 detects the deviation from the correlation of the drive side temperature and the non-drive side temperature based on the drive side temperature and the non-drive side temperature of the motor 3 during normal operation. Specifically, the detection unit 85 in the controller 58 reads the correlation of the motor 3 stored in the correlation storage unit 80, for example, the correlation illustrated by the dotted line in FIG. 8 (step S3). For example, if the temperature acquisition unit 82 acquires the drive side temperature and the non-drive side temperature in period B illustrated in FIG. 7, the detection unit 85 in the controller 58 creates the graph illustrated in FIG. 9 and detects the deviation from the correlation of the motor 3 by comparing with the correlation of the motor 3.

If the detection unit 85 does not detect the deviation from the correlation of the motor 3 (No in step S4), the controller 58 returns to the process of step S1 and repeats the steps from step S1. If the detection unit 85 detects the deviation from the correlation of the motor 3 (Yes in step S4), the controller 58 stores the result of the detection by the detection unit 85 in the alarm database 62 as the information on the abnormality indication in the motor 3 (Step S5) and repeats the processes of steps S1 to S5.

Note that, when the request for acquiring the information on the abnormality or the abnormality indication in the target machine is received from the monitoring terminal 12 via the data communication unit 68, the output unit 87 in the controller 58 outputs the deviation from the correlation detected by the detection unit 85 and stored in the alarm database 62 to the data communication unit 68 as the information on the abnormality indication in the motor 3.

Also, in the embodiment described above, the abnormality in the motor 3 is predicted only on the basis of the drive side temperature and the non-drive side temperature, but the abnormality in the motor 3 may be predicted on the basis of at least one of the drive side vibration value and the non-drive side vibration value in addition to the drive side temperature and the non-drive side temperature. In addition, in the embodiment described above, the case in which the abnormality indication in the motor 3 is detected has been described as an example, but similar processes are performed in case of detecting the abnormality indication in the fan 5.

Figure 13:
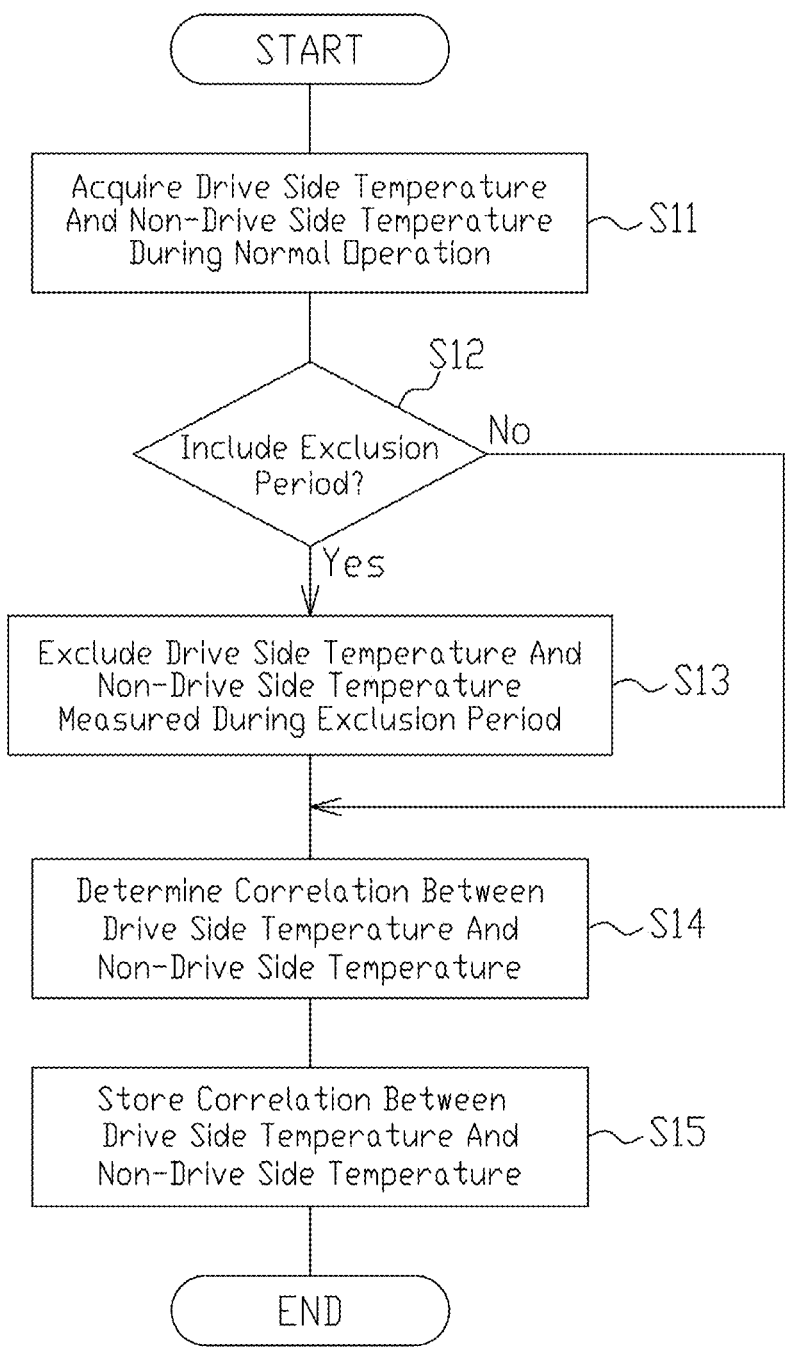
FIG. 13 is a flowchart explaining a process in which the abnormality detection device calculates the correlation between the drive side temperature and the non-drive side temperature of the target machine according to an embodiment.

Next, with reference to the drawings, a correlation calculation method for determining the correlation of the target machine by the abnormality detection device 10 according to the present embodiment will be described. FIG. 13 is a flowchart for explaining a process executed by the controller 58 of the abnormality detection device 10 to determine the correlation of the target machine (the motor 3).

The controller 58 determines the correlation of the motor 3 on the basis of the previously acquired drive side temperature and the previously acquired non-drive side temperature stored in the temperature/vibration value storage unit 81 in the data server 7. Specifically, the temperature acquisition unit 82 in the controller 58 acquires two or more of the drive side temperatures and the non-drive side temperatures measured during normal operation (for example, period A illustrated in FIG. 7) from the previously acquired drive side temperature and the previously acquired non-drive side temperature stored in the temperature/vibration value storage unit 81 in the data server 7 (step S11). Then, the calculation unit 84 determines whether or not the drive side temperature and the non-drive side temperature measured between the time when the determination unit 86 determines that the motor 3 has stopped operation and the time when the determination unit 86 determines that the motor 3 has resumed operation and the drive side temperature and the non-drive side temperature measured during a predetermined period after the determination unit 86 determines that the motor 3 has resumed operation are included among the drive side temperature and the non-drive side temperature acquired in step S11.

Note that, when the vibration value acquisition unit 83 acquires the drive side vibration value and the non-drive side vibration value, the determination unit 86 determines that the motor 3 has stopped operation if the drive side vibration value and the non-drive side vibration value drop by the predetermined value or more, and the determination unit 86 determines that the motor 3 has resumed operation if the drive side vibration value and the non-drive side vibration value rise by the predetermined value or more while the motor 3 stops operation and the controller 58 stores, for example, a period while the motor 3 stops operation in the correlation storage unit 80 or the like preliminarily.

The calculation unit 84 reads the period while the motor 3 stops operation stored in the correlation storage unit 80 or the like. The calculation unit 84 determines there is no exclusion period if the drive side temperature and the non-drive side temperature measured during the period while the motor 3 stops operation and measured during the predetermined period after the period while the motor 3 stops operation expires are not included in the drive side temperature and the non-drive side temperature acquired in step S11 (No in step S12). Then, the step proceeds to step S14. On the other hand, the calculation unit 84 determines there is the exclusion period if the drive side temperature and the non-drive side temperature measured during the period while the motor 3 stops operation and measured during the predetermined period after the period while the motor 3 stops operation expires are included in the drive side temperature and the non-drive side temperature acquired in step S11 (Yes in step S12). Then, the calculation unit 84 excludes the drive side temperature and the non-drive side temperature measured during the exclusion period from the drive side temperature and the non-drive side temperature during normal operation (step S13). That is, the calculation unit 84 excludes all data on the drive side temperature and the non-drive side temperature measured during a period from the time when the motor 3 has stopped operation to the time when the predetermined period expires after the motor 3 resumes operation, from data for determining the correlation of the motor 3.

The calculation unit 84 determines the correlation of the motor 3 on the basis of the drive side temperature and the non-drive side temperature acquired in step S11 (step S14). That is, on the basis of two or more data measured during normal operation of the motor 3 (period A illustrated in FIG. 7) (note that the data measured during the exclusion period is excluded), the calculation unit 84 creates the graph with the horizontal axis as the non-drive side temperature of the motor 3 and the vertical axis as the drive side temperature of the motor 3 as illustrated in FIG. 8. The calculation unit 84 determines that there is the simple regression correlation between the non-drive side temperature and the drive side temperature (the dotted line illustrated in FIG. 8) during normal operation of the motor 3 by creating the graph.

The controller 58 stores the correlation of the motor 3 determined by the calculation unit 84 in step S14 in the correlation storage unit 80 (step S15). Note that, in the embodiment described above, the case in which the correlation of the motor 3 is determined has been described as an example, but similar processes are performed in case of determining the correlation of the fan 5.

According to the abnormality detection device and the abnormality detection method described in the present embodiment, it is possible to find the abnormality or the abnormality indication in the target machine at an early stage by detecting the deviation from the correlation between the drive side temperature and the non-drive side temperature of the target machine. Conventionally, a worker inspected the target machine after receiving an alarm notifying that the vibration value exceeded the threshold (at point D in FIG. 7), but it was 30 to 40 hours before the target machine failed (at point E in FIG. 7) when the alarm was issued. Since, for example, the bearings of the rotating machine were already severely damaged when the alarm was issued, life extension measures such as greasing and the like were not very effective and often too late. However, in the abnormality detection device according to the present embodiment, since the deviation from the correlation of the drive side temperature and the non-drive side temperature of the target machine is detected, it is possible to detect the abnormalities in the target machine such as damage to a bearing, running out of grease, sticking of grease, generation of rust, and the like in period B or C before point D illustrated in FIG. 7. In addition, also in case of managing numerous target machines installed in remote locations and the like, since it is possible to find the abnormality in the target machine at an early stage by detecting the deviation from the correlation between the drive side temperature and the non-drive side temperature of the target machine, it is not required to monitor the trend data of each target machine constantly.

Furthermore, according to the abnormality detection device and the abnormality detection method described in the present embodiment, it is possible to determine when the target machine stops operation and when the target machine resumes operation, from the fluctuation of the drive side vibration value and the non-drive side vibration value of the target machine. Therefore, it is not required to separately provide a machine or system for managing information on when the target machine stops operation and when the target machine resumes operation, and it is possible to grasp the information on when the target machine stops operation and when the target machine resumes operation. In addition, there are some cases that the condition of the target machine may change suddenly due to sticking of grease, generating rust due to water intrusion into the deteriorated bearing, and the like caused by stopping operation of the target machine, but since the data on the drive side temperature and the non-drive side temperature measured between the time when the target machine stops operation and the time when the predetermined period expires after the target machine resumes operation are excluded from the data for determining the correlation, it is possible to determine the correlation of the target machine without being affected by the sudden changes of the condition described above.

Note that, in the embodiment described above, the calculation unit 84 determines the correlation of the target machine, and the detection unit 85 detects the deviation from the correlation on the basis of the drive side temperature and the non-drive side temperature acquired from the temperature acquisition unit 82. Otherwise, the calculation unit 84 may determine a regression value of the non-drive side temperature (hereinafter referred to as a non-drive side regression value) by calculating simple regression analysis of the drive side temperature, and the detection unit 85 may detect the deviation from the correlation of the target machine on the basis of a result of comparing the non-drive side regression value with a non-drive side measured value as the non-drive side temperature acquired from the temperature acquisition unit 82. In addition, the calculation unit 84 may determine a regression value of the drive side temperature (hereinafter referred to as a drive side regression value) by calculating the simple regression analysis of the non-drive side temperature, and the detection unit 85 may detect the deviation from the correlation of the target machine on the basis of a result of comparing the drive side regression value with a drive side measured value as the drive side temperature acquired from the temperature acquisition unit 82.

Specifically, the calculation unit 84 determines at least one of the non-drive side regression value and the drive side regression value on the basis of the drive side temperature and the non-drive side temperature of the motor 3 during normal operation of the target machine (period A illustrated in FIG. 7). The non-drive side regression value and the drive side regression value determined by the calculation unit 84 are stored in the correlation storage unit 80. The detection unit 85 determines a difference between the non-drive side temperature (the non-drive side measured value) acquired from the temperature acquisition unit 82 and the non-drive side regression value calculated by the calculation unit 84 and stored in the correlation storage unit 80.

Figure 14:
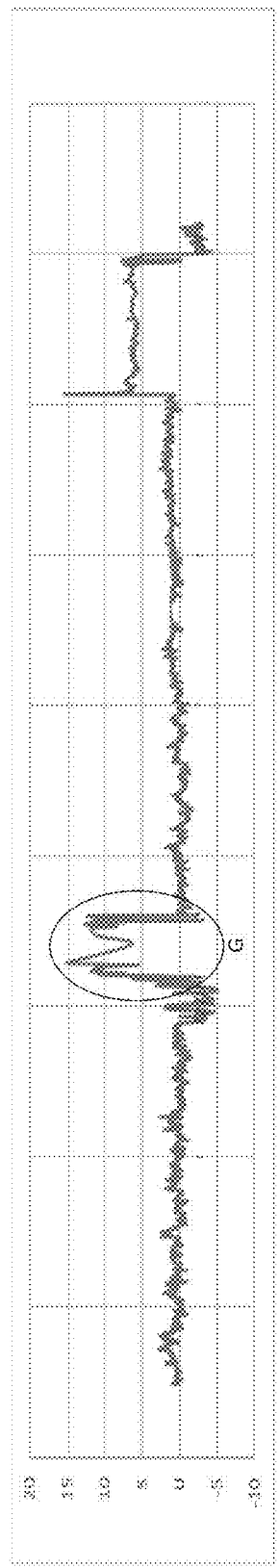
FIG. 14 is a graph illustrating an example of a trend of a difference between a regression value and a measured value of the target machine according to an embodiment.

Hereinafter, a case in which the motor 3 indicates a trend of a difference between the regression value and the measured value as illustrated in FIG. 14 will be described as an example. Note that time on a horizontal axis of a graph illustrated in FIG. 14 corresponds to the time on the horizontal axis of the graph illustrated in FIG. 7. As is clear from the graph illustrated in FIG. 14, there is a turbulence in the difference between the regression value and the measured value at period G illustrated in FIG. 14. Period G illustrated in FIG. 14 corresponds to periods B and C illustrated in FIG. 7, that is, a period when the drive side vibration value of the motor 3 increases gradually. As illustrated in FIG. 14, since the difference between the regression value and the measured value fluctuates largely, the detection unit 85 determines that there is a high possibility that an abnormality in the motor 3 has occurred at period G illustrated in FIG. 14.

In addition, in the embodiment described above, the determination unit 86 determines whether the target machine stops operation or the target machine resumes operation on the basis of the fluctuation of the vibration value only of the target machine. Otherwise, in addition to the vibration value of the target machine, the determination unit 86 may determine whether the target machine stops operation or the target machine resumes operation on the basis of a change in temperature of the target machine.

REFERENCE SIGNS LIST

2: Abnormality detection system, 3: Motor, 4a to 4d: Wireless slave units, 5: Fan, 6: Wireless master unit, 7: Data server, 10: Abnormality detection device, 12: Monitoring terminal, 14: Sensor, 16: Microcomputer, 18: Transceiver, 19: Power controller, 20: Temperature sensor, 22: Acceleration sensor, 34: A/D converter, 36: Memory, 38: Arithmetic processor, 40: RTC unit, 42: Arithmetic program, 44: Controller, 46: Management unit, 48: RF communication unit, 50: Communication unit, 52: Clock unit, 54: Wireless slave unit management table, 56: Database, 57: Server controller, 58: Controller, 59: Wireless master unit management table, 61: Wireless slave unit management table, 62: Alert database, 65: Communication unit, 66: Data communication unit, 68: Data communication unit, 70: Monitoring terminal controller, 72: Data communication unit, 74: Input unit, 76: Display unit

The invention claimed is:

1. An abnormality detection device that detects an abnormality in a target machine, the abnormality detection device comprising:
   a first acquisition unit configured to acquire a drive side temperature of the target machine;
   a second acquisition unit configured to acquire a non-drive side temperature of the target machine;
   a calculation unit configured to determine a drive side regression value of the drive side temperature by simple regression analysis of the non-drive side temperature and a non-drive side regression value of the non-drive side temperature by simple regression analysis of the drive side temperature,
   a correlation storage unit configured to store the drive side regression value and the non-drive side regression value determined by the calculation unit as a correlation between the drive side temperature and the non-drive side temperature;
   a detection unit configured to detect at least one of (1) a deviation from the correlation based on a comparison result between the drive side regression value stored in the correlation storage unit and a drive side measured value as the drive side temperature acquired by the first acquisition unit and (2) a deviation from the correlation based on a comparison result between the non-drive side regression value stored in the correlation storage unit and a non-drive side measured value as the non-drive side temperature acquired by the second acquisition unit; and
   an output unit configured to output at least one of the deviation from the correlation detected by the detection unit as the abnormality or an abnormality indication in the target machine.

2. The abnormality detection device according to claim 1, further comprising:
   a third acquisition unit configured to acquire two or more of the drive side temperatures and two or more of the non-drive side temperatures during normal operation of the target machine, wherein
   the calculation unit is configured to determine the correlation on the basis of two or more of the drive side temperatures and two or more of the non-drive side temperatures acquired by the third acquisition unit.

3. The abnormality detection device according to claim 2, further comprising:
   a fourth acquisition unit configured to acquire a drive side vibration value of the target machine; and
   a fifth acquisition unit configured to acquire a non-drive side vibration value of the target machine, wherein
   the detection unit detects the deviation from the correlation on the basis of at least one of the drive side vibration value acquired by the fourth acquisition unit and the non-drive side vibration value acquired by the fifth acquisition unit.

4. The abnormality detection device according to claim 3, further comprising:
   a determination unit configured to determine that the target machine has stopped operation when the drive side vibration value acquired by the fourth acquisition unit and the non-drive side vibration value acquired by the fifth acquisition unit drop by a predetermined value or more and that the target machine has resumed operation when the drive side vibration value acquired by the fourth acquisition unit and the non-drive side vibration value acquired by by a predetermined value or more while the target machine stops operation, wherein
   the calculation unit excludes the drive side temperature and the non-drive side temperature acquired between time when the determination unit determines that the target machine has stopped operation and time when the determination unit determines that the target machine has resumed operation, from the drive side temperature and the non-drive side temperature during normal operation.

5. The abnormality detection device according to claim 4, wherein
   the calculation unit excludes the drive side temperature and the non-drive side temperature acquired during a predetermined period after the determination unit determines that the target machine has resumed operation, from the drive side temperature and the non-drive side temperature during normal operation.

6. The abnormality detection device according to claim 4, wherein
   the determination unit determines at least one of whether the target machine has stopped operation or the target machine has resumed operation on the basis of the drive side temperature acquired by the first acquisition unit and the non-drive side temperature acquired by the second acquisition unit.

7. An abnormality detection method for detecting an abnormality in a target machine by an abnormality detection device that detects the abnormality in the target machine, the abnormality detection method comprising:
   a first acquisition step in which the abnormality detection device acquires a drive side temperature of the target machine;

a second acquisition step in which the abnormality detection device acquires a non-drive side temperature of the target machine;

a calculation step in which the abnormality detection device determines a drive side regression value of the drive side temperature by simple regression analysis of the non-drive side temperature and a non-drive side regression value of the non-drive side temperature by simple regression analysis of the drive side temperature a detection step in which the abnormality detection device detects at least one of (1) a deviation from a correlation based on a comparison result between the drive side regression value determined in the calculation step and a drive side measured value as the drive side temperature acquired by the first acquisition step and (2) a deviation from the correlation based on a comparison result between the non-drive side regression value determined in the calculation step and a non-drive side measured value as the non-drive side temperature acquired by the second acquisition step; and an output step in which the abnormality detection device outputs at least one of the deviation from the correlation as the abnormality or an abnormality indication in the target machine.

8. The abnormality detection method according to claim 7, further comprising:

a third acquisition step of acquiring two or more of the drive side temperatures and two or more of the non-drive side temperatures during normal operation of the target machine, wherein the calculation step determines the correlation on the basis of two or more of the drive side temperatures and two or more of the non-drive side temperatures acquired in the third acquisition step.

9. The abnormality detection method according to claim 8, further comprising:

a fourth acquisition step of acquiring a drive side vibration value of the target machine; and a fifth acquisition step of acquiring a non-drive side vibration value of the target machine, wherein the detection step includes detecting the deviation from the correlation on the basis of at least one of the drive side vibration value and the non-drive side vibration value.

10. The abnormality detection method according to claim 9, further comprising:

a determination step of determining that the target machine has stopped operation when the drive side vibration value and the non-drive side vibration value drop by a predetermined value or more and determining that the target machine has resumed operation when the drive side vibration value and the non-drive side vibration value rise by a predetermined value or more while the target machine stops operation, wherein the calculation step is for excluding the drive side temperature and the non-drive side temperature acquired between time when it is determined in the determination step that the target machine has stopped operation and time when it is determined in the determination step that the target machine has resumed operation, from the drive side temperature and the non-drive side temperature during normal operation.

11. The abnormality detection method according to claim 10, wherein the calculation step is for excluding the drive side temperature and the non-drive side temperature acquired during a predetermined period after it is determined in the determination step that the target machine has resumed operation, from the drive side temperature and the non-drive side temperature during normal operation.

12. The abnormality detection method according to claim 10, wherein the determination step includes determining at least one of whether the target machine has stopped operation or the target machine has resumed operation on the basis of the drive side temperature and the non-drive side temperature.

13. The abnormality detection device according to claim 1, further comprising:

a fourth acquisition unit configured to acquire a drive side vibration value of the target machine; and a fifth acquisition unit configured to acquire a non-drive side vibration value of the target machine, wherein the detection unit detects the deviation from the correlation on the basis of at least one of the drive side vibration value acquired by the fourth acquisition unit and the non-drive side vibration value acquired by the fifth acquisition unit.

14. The abnormality detection device according to claim 13, further comprising:

a determination unit configured to determine that the target machine has stopped operation when the drive side vibration value acquired by the fourth acquisition unit and the non-drive side vibration value acquired by the fifth acquisition unit drop by a predetermined value or more and that the target machine has resumed operation when the drive side vibration value acquired by the fourth acquisition unit and the non-drive side vibration value acquired by the fifth acquisition unit rise by a predetermined value or more while the target machine stops operation, wherein the calculation unit excludes the drive side temperature and the non-drive side temperature acquired between time when the determination unit determines that the target machine has stopped operation and time when the determination unit determines that the target machine has resumed operation, from the drive side temperature and the non-drive side temperature during normal operation.

15. The abnormality detection device according to claim 14, wherein the calculation unit excludes the drive side temperature and the non-drive side temperature acquired during a predetermined period after the determination unit determines that the target machine has resumed operation, from the drive side temperature and the non-drive side temperature during normal operation.

16. The abnormality detection device according to claim 5, wherein the determination unit determines at least one of whether the target machine has stopped operation or the target machine has resumed operation on the basis of the drive side temperature acquired by the first acquisition unit and the non-drive side temperature acquired by the second acquisition unit.

17. The abnormality detection device according to claim 15, wherein the determination unit determines at least one of whether the target machine has stopped operation or the target machine has resumed operation on the basis of the drive side temperature acquired by the first acquisition unit and the non-drive side temperature acquired by the second acquisition unit.

\* \* \* \* \*